Nov. 3, 1931.  E. H. DAMMEYER  1,829,789
GREASE GUN
Filed Dec. 30, 1929

INVENTOR.
E. H. Dammeyer
BY
Elwin M. Hulse
ATTORNEY.

Patented Nov. 3, 1931

1,829,789

UNITED STATES PATENT OFFICE

EDWIN H. DAMMEYER, OF FORT WAYNE, INDIANA

GREASE GUN

Application filed December 30, 1929. Serial No. 417,347.

The invention relates to grease guns for use in applying grease to various machine parts such as motor vehicles.

The object of the invention is to provide a simple and efficient power driven grease gun that is readily held in the hand and controlled thereby.

Another object is to provide a power driven grease gun with means by which the grease discharging mechanism may be retracted either by the power or by hand.

Other objects will appear hereinafter.

Figure 1:
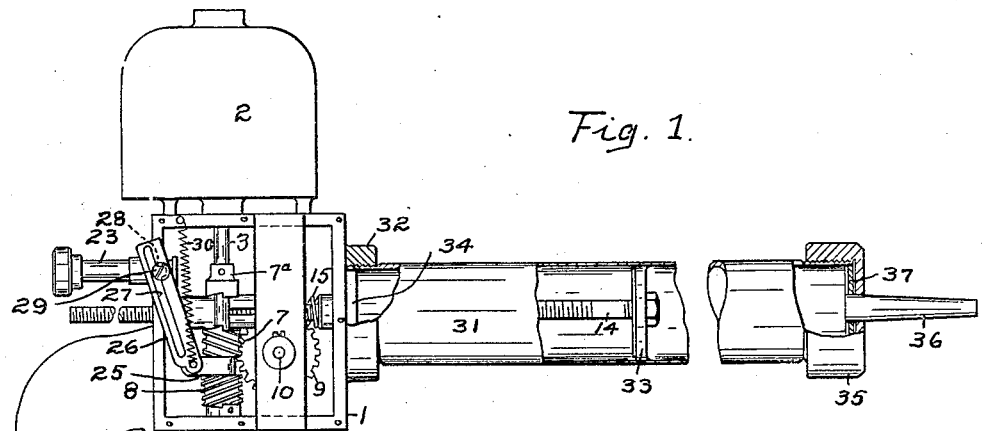
Figure 3:
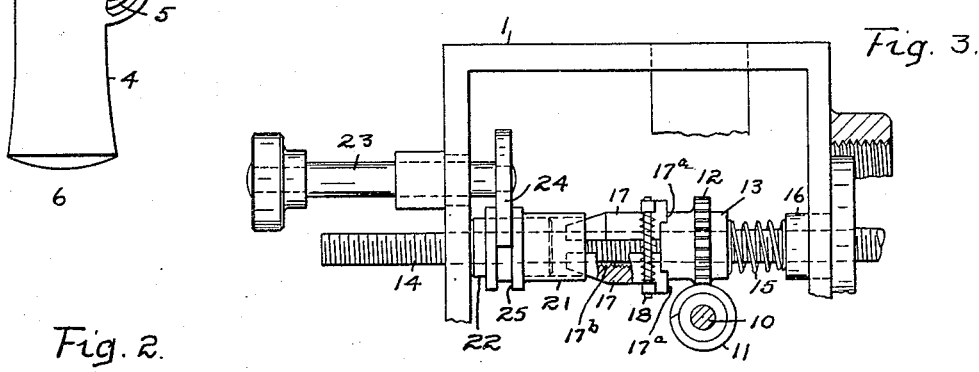
Figure 2:
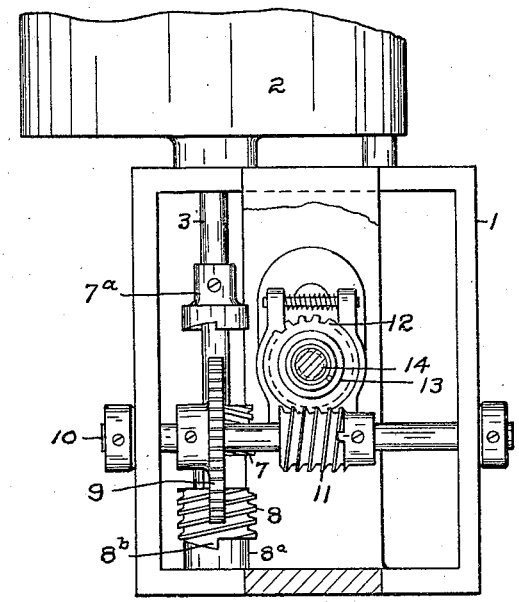
Figures 4, 5, 6:
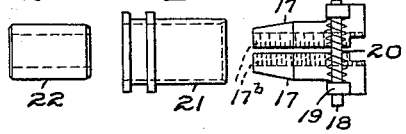
Figure 7:
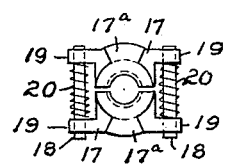

The invention consists of the novel combination and arrangement of parts hereinafter described and illustrated in the drawings, in which drawings Figure 1 is a side elevational view of a grease gun embodying the invention; Fig. 2 an enlarged cross section on line 2—2 of Fig. 1; Fig. 3 a side elevation, partly in section of the clutch mechanism of the plunger operating devices; Fig. 4 an elevational view of the clutch sleeve bearing; Fig. 5 a side elevational view of the clutch sleeve; Fig. 6 a plan view of the clutch jaws, and Fig. 7 an end view of said clutch jaws.

In the illustrative embodiment of the invention, 1 represents a main frame upon which is mounted a suitable electric motor 2 having its shaft 3 extending downwardly through the frame, 4 is a handle secured to the frame and having a switch therein the operating arm 5 of which projects from the handle where it is convenient for operation by one of the fingers of the hand that grasps the handle. Electrical current is supplied through the wires 6 that extend into the handle and are connected to the switch terminals and to the motor 2.

Two worms 7, 8 are secured to a sleeve that is longitudinally slidable on the motor shaft 3. A notched sleeve 8ª is secured to the shaft 3 below the worm 8 and a tapered lug 8ᵇ on the worm 8 is adapted to engage the said notch for locking the worm to the sleeve, and a notched sleeve 7ª is secured to the shaft 3 above the worm 7 a tapered lug on said worm being adapted to engage in the notch in sleeve 7ª to lock the worm 7 to the shaft 3. The worms are threaded right and left respectively and either may be caused to engage a gear 9 secured to a shaft 10 that is revolubly mounted on the main frame. A worm 11 is secured to or formed on the shaft 10 and meshes with a gear 12 formed on a sleeve 13 through which the threaded plunger rod 14 freely extends. A spring 15 bears at one end on the sleeve 13 and at its other end the spring bears against the bearing 16 for the rod 14. A clutch member is engaged on the opposite end of the sleeve 13 and consists of two internally threaded semi-cylindrical jaws 17 held together by the pins 18 inserted through the apertured lugs 19 projecting from the jaws adjacent the forward end thereof. A spring 20 surrounds each pin 18 and tends to maintain the jaws in separated position. The forward face of each jaw is recessed to receive the lugs 17ª on the rear end of the sleeve 13 whereby to engage the jaws to the sleeve.

The opposite end of each jaw 17 is tapered and is adapted to be engaged by the clutch sleeve 21 when said sleeve is moved longitudinally on the bearing 22 that supports it. The clutch sleeve 21 opposed by the springs 20 presses the two jaws 17 toward each other causing their internal threads 17ᵇ to engage the threads on the rod 14 and thereby cause the rotating clutch jaws 17 to reciprocate the rod 14 in accordance with the direction of rotation of the gear 12.

A rod 23 reciprocably mounted on the main frame and projecting therefrom above the handle 4, carries a fork 24 that is engaged in an annular groove 25 formed in the periphery of the clutch sleeve 21. By moving the rod 23 inwardly the sleeve 21 is caused to engage the clutch jaws 17 and press them toward each other, the opposite movement of the rod 23 serving to release the latter engagement and consequent release of the jaws 17 from the rod 14.

A collar 25 is loose on the sleeve that supports the worms 7 and 8 and a link 26 having a longitudinal slot 27 therein is pivoted at its lower end to the collar 25. A notch 28 is also formed in the link 26 which opens into the slot 27 in the link. A stud or screw 29 projects from the main frame and extends through the slot 27 in the link. A spring 30 is secured to the frame and to the lower end of the link 26.

The spring 30 normally tends to raise the worms 7, 8 in elevated position on the motor shaft 3 with the worm 8 in mesh with the gear 9. By depressing the link 26 the worms are moved downwardly on the shaft 3, the stud or screw 29 eventually engaging in the notch 28 at which time the worm 7 is in engagement with the gear 9 and the worm 8 engages the sleeve 8ª. The engagement of the stud or screw in the notch 28 retains the link in its down position and the worm 7 remains in engagement with the gear 9. Worm 7 is adapted to drive the several gears so that the plunger rod 14 is advanced, worm 8 being adapted to cause the rod 14 to retract. The link is readily released from the stud or screw 29 and when it is released the spring 30 moves the worm 8 into engagement with the gear 9 and the worm 7 into engagement with the clutch sleeve 7ª for reversing the movement of the plunger rod.

Since the clutch members 21 and 17 must be in engagement to cause the plunger rod to reciprocate, the release of said clutch members releases the plunger rod so that it may be retracted by hand when desired.

A cylinder 31 is carried by the main frame 1. The inner end of the cylinder is exteriorly threaded and the threads thereon engage an internally threaded boss 32 formed on the main frame. A plunger 33 of suitable form is attached to the inner end of the plunger rod 14 that projects through an opening in the frame 1 and in the annular stop 34 carried by the frame. The opposite or forward end of the cylinder is exteriorly threaded to receive a cap or other closure 35. The cap is apertured to receive a nozzle 36. In Fig. 1 the nozzle 36 is held in position by a washer 37. Various forms of caps and nozzles may be attached to the cylinder.

Suitable plates will be attached to the frame to cover the open sides thereof so as to enclose the several gears, the link being preferably exteriorly of the adjacent cover plate.

It is evident that the cylinder is readily removed from the main frame for refilling with the substance to be forced from it by the plunger, or a filled cylinder may be quickly substituted for a cylinder that is exhausted of its contents before the particular job has been finished. The operator has at hand three controls for the device, namely: the switch, the clutch and the link. The release of the link is especially useful when it is desired to retract the plunger a short distance and the clutch is useful when it is desired to fully retract the plunger in order to remove the cylinder.

What I claim is:

1. A grease gun comprising a frame, a handle on the frame, an electric motor mounted on the frame and having an extended shaft, a cylinder carried by the frame, a plunger within the cylinder, a rod secured to the plunger and projecting from one end thereof through the frame, a clutch adapted to engage the rod, and a train of gears and worms driven by the shaft and adapted, under the control of the clutch, to cause the rod and plunger to reciprocate.

2. A grease gun comprising a frame, a handle on the frame, an electric motor mounted on the frame and having a shaft extended into the frame, a cylinder carried by the frame, a plunger within the cylinder, a threaded rod secured to the plunger and projecting from the cylinder and through the frame, a revoluble internally threaded sleeve loosely mounted on the rod, means to cause the sleeve threads to engage the threads on the rod, and means having connection with the shaft and with the sleeve for rotating the sleeve to cause the rod and plunger to reciprocate.

3. A grease gun comprising a frame, an electric motor mounted on the frame, a cylinder removably carried by the frame, a plunger within the cylinder, a threaded rod secured to the plunger and projecting from the cylinder, a loose gear member revolubly mounted on a rod, a resilient member opposing longitudinal movement of the gear member in one direction, an internally threaded longitudinally split clutch sleeve loosely mounted on the shaft and connected to the gear member, means to cause the threads on the clutch sleeve to engage the threads on the rod, a train of gears and worms having connection with the gear member, two worms slidably mounted on the shaft, the threads on one of the latter worms being reverse to those on the other, and means to move either of said latter worms into connection with the said train for causing the plunger rod to reciprocate.

4. A grease gun comprising a frame, an electric motor mounted on the frame and having a shaft extending into the frame, a cylinder removably mounted on the frame, a plunger in the cylinder, a threaded rod secured to the plunger and projecting from the cylinder and through the frame, a gear-carrying member revolubly and loosely mounted on the rod, two resiliently connected internally threaded semi-circular members engaging the gear carrying member and disposed adjacent to the rod, a longitudinally slidable sleeve adapted to engage the semi-circular members and cause the threads thereof to engage the threaded rod, means to slide the said sleeve, and means having connection with the gear carrying member and adapted to be connected to the motor shaft for rotating said semi-circular members and cause the plunger to reciprocate.

In witness whereof I have hereunto subscribed my name.

EDWIN H. DAMMEYER.